3,334,982
MANUFACTURE OF SILICA GLASS
René Mattmüller, Valette, Malakoff, Seine, France, assignor to Compagnie de Saint-Gobain, Neuilly-sur-Seine, France
Filed Jan. 30, 1962, Ser. No. 169,763
Claims priority, application France, Feb. 2, 1961, 851,475
4 Claims. (Cl. 65—30)

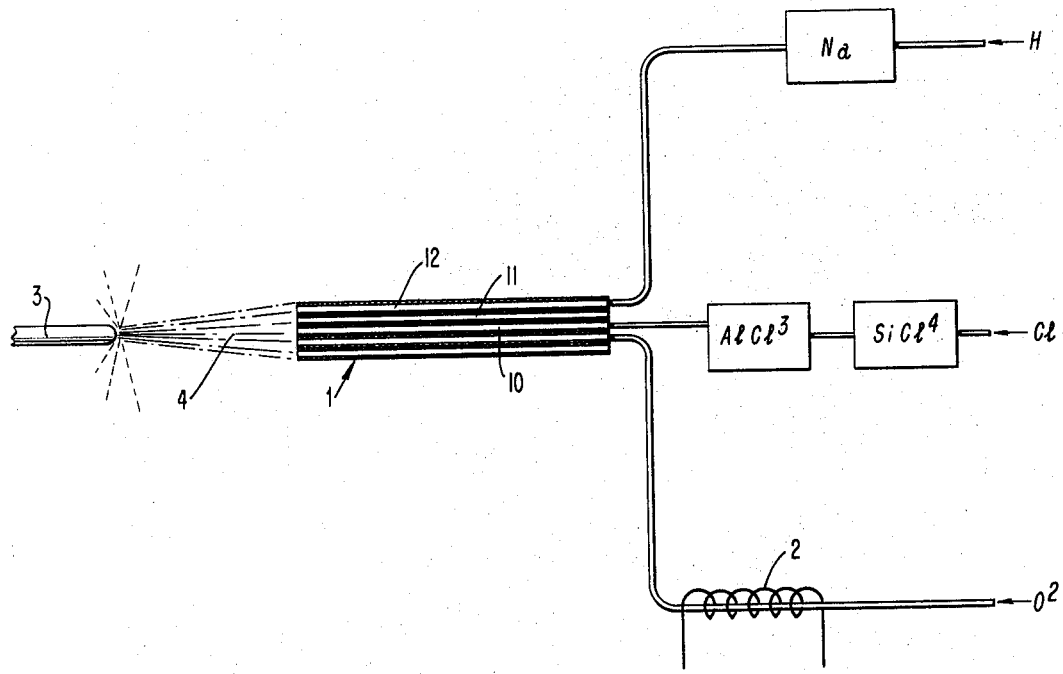

This invention relates to the manufacture of silica glass by the decomposition of the vapors of a silicon halide, such as silicon tetrachloride, in the flame of an oxyhydrogen blowpipe and the vitrification of the silica collected on a support.

In the prior art the silicon halide is entrained in the oxygen which supplies the blowpipe, but this is imperfect in that amorphous silica forms on and restricts the discharge orifice of the burner. To overcome that difficulty it has been suggested to interpose an inert gas, for instance nitrogen or argon, between the oxygen loaded with vapors of silicon halide and the hydrogen so as to produce a gaseous screen preventing the oxhydric reaction at the output of the burner and to transport the flame beyond the burner and prevent the accumulation on the burner, but the inert gas chills the flame and reduces the yield. It has also been suggested to interpose between the oxygen loaded with halide vapors and the hydrogen, oxygen free from halide vapors in place of the inert gas. The flame is in this case not separated from the burner but the decomposition of the silicon halide vapors is slightly retarded sufficiently to avoid the collection of amorphous silica on the burner and therefore prevent the restriction of the discharge orifice. The apparatus must however provide an additional oxygen input and becomes complex. Moreover if oxygen will entrain $SiCl_4$, this is not the case for several other silicon halides.

The objects of the invention are to improve the manufacture of silica glass by vapor phase reactions utilizing the blowpipe process, to prevent accumulations on the burner orifice, and ameliorate the operation of the blowpipe.

The objects are accomplished, generally speaking, by a method of preparing silica glass that comprises entraining a silicon halide in a current of halogen gas, bringing the current together with a current of hydrogen and a current of oxygen, igniting them, and condensing the glass formed on a cold surface.

A major feature of this invention is the use of a halogen gas to entrain the silicon halide vapors. A major advantage is the complete elimination of the difficulties that plagued the prior art. The operation of the blowpipe is improved and the formation of accumulations is ended. The most advantageous halogen for the entrainment of the silicon halide is chlorine. The chlorine stabilizes the silicon halide vapors, which do not decompose even as they enter the flame. The chlorine reacts with hydrogen exothermically and the flame suffers no cooling. Furthermore, when chlorine is used, chips of metals can be introduced directly into the evaporation container instead of handling silicon halides several of which, being hydrolyzable and generating fumes, decompose in air.

The blowpipe is shown in vertical section in the drawing and may conveniently be comprised of three concentric tubes, of which the central receives silicon halide in a stream of halogen gas, particularly chlorine, the intermediate tube receives oxygen, and the outer receives hydrogen. The silica or glass formed in the flame blown from the blowpipe is directed upon a cold support, which may be a refractory rod moving endwise through the flame as it is rotated about its axis and is separated from said support after cooling by means of a millstone.

The invention may produce pure silica glass containing 90 to 100% $SiO_2$ or it may produce silica glass containing other ingredients such as germanium oxide, alumina, titatnium dioxide, ferric oxide, either separately or simultaneously for several of them, with various concentrations. These ingredients may be entrained either by one of the gases or by both the halogen and the hydrogen. For instance, sodium and other alkali metals may be entrained in the hydrogen, and aluminum chloride may be entrained with the silicon chloride in the halogen gas stream. These added ingredients are most frequently present in about 5 weight percent of the glass. This simultaneouse entrainment of different ingredients by the hydrogen and the halogen streams is advantageous in making the more complex glasses.

The decomposition products are heated to a temperature at which the vapor tension is sufficient to produce an adequate entrainment.

For instance $SiCl_4$ need only be brought to room temperature and chlorine is allowed to bubble in the $SiCl_4$ vapors. Aluminum chloride may be heated to 90° C. and the vapors are leached by a chlorine stream.

The pipings conducting the vapors are heated only if necessary to obviate condensation. Accordingly no heating is necessary with $SiCl_4$. For aluminum chloride the pipings may be heated up to about 200° C.

Oxygen may be heated at the same temperatures as those of the vapors utilized.

The proportion between the vapors varies with the compositions to obtain.

Examples

The drawing is a schematic view of the invention in operation, the blowpipe being comprised of three concentric tubes 10, 11, 12. Into the central tube 10 is flowed a stream of chlorine gas which has been bubbled through liquid $SiCl_4$ at room temperature and contacted with solid $AlCl_3$ heated to approximately 90° C. to entrain both $SiCl_4$ and $AlCl_3$. A stream of oxygen flows to the intermediate tube 11. This oxygen can be preheated in heater 2. A stream of hydrogen entraining sodium vapors flows into the outer tube 12. The gaseous mixture is ignited and burns at 4. The products of reaction are collected on a cold rod 3 which is rotated in and moved endwise through the flame 4.

An ingot of transparent silica containing $Al_2O_3$ and $Na_2O$ is obtained, for example with the following composition:

| | Percent |
|---|---|
| $SiO_2$ | 94 |
| $Al_2O_3$ | 5 |
| $Na_2O$ | 1 |

Other glasses may be obtained, for example, an ingot of transparent silica containing $GeO_2$ with the following composition:

| | Percent |
|---|---|
| $SiO_2$ | 99.6 |
| $GeO_2$ | 0.4 |

The $GeCl_4$ is heated to about 100° C.

An ingot of a silica glass containing $GeO_2$ and $Na_2O$, for example with the following composition:

| | Percent |
|---|---|
| $SiO_2$ | 99.32 |
| $GeO_2$ | 0.50 |
| $Na_2O$ | 0.18 |

The $GeCl_4$ is heated to about 110° C.

An ingot of a silica glass containing $Na_2O$, for example with the following composition:

| | Percent |
|---|---|
| $SiO_2$ | 99.86 |
| $Na_2O$ | 0.14 |

The sodium metal vapors are entrained by an hydrogen preheated stream.

In all cases the support must be chosen according to the glass to be obtained. In the examples given the support is a silica rod.

What is claimed is:

1. A method of preparing silica glass that comprises entraining a silicon halide in a current of chlorine, bringing the current together with currents of oxygen and hydrogen and igniting them, and condensing the glass formed on a cold surface.

2. The gas phase method of making glass which comprises forming concentric streams of chlorine, oxygen, and hydrogen with chlorine at the center and hydrogen as an exterior envelope, entraining silicon tetrachloride in the chlorine, igniting the concentric streams, and collecting the glass formed thereby.

3. The gas phase method of making glass which comprises forming concentric streams of chlorine, oxygen, and hydrogen with chlorine at the center and hydrogen as an exterior envelope, entraining silicon tetrachloride in the chlorine, entraining an alkali metal in the hydrogen, igniting the concentric streams, and collecting the glass formed thereby.

4. A method of preparing a silica glass that comprises entraining a silicon halide in a current of chlorine gas, entraining an alkali metal in a current of hydrogen, bringing the currents together with a current of oxygen, igniting them and condensing the glass formed on a cold surface.

References Cited

UNITED STATES PATENTS

| | | | |
|---|---|---|---|
| 2,272,342 | 2/1942 | Hyde | 65—18 XR |
| 2,798,792 | 7/1957 | Stelling et al. | 23—182 |
| 2,967,113 | 1/1961 | Liebhafsky et al. | 65—32 XR |
| 3,043,660 | 7/1962 | Hughes et al. | 23—182 |
| 3,128,166 | 4/1964 | Mohn | 65—33 |

DONALL H. SYLVESTER, *Primary Examiner.*

G. R. MYERS, *Assistant Examiner.*